United States Patent
Bookbinder et al.

(10) Patent No.: US 10,465,585 B2
(45) Date of Patent: Nov. 5, 2019

(54) EXHAUST GAS TREATMENT ARTICLE AND METHODS OF MANUFACTURING SAME

(71) Applicant: Corning Incorporated, Corning, NY (US)

(72) Inventors: Dana Craig Bookbinder, Corning, NY (US); Pushkar Tandon, Painted Post, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 122 days.

(21) Appl. No.: 15/560,054

(22) PCT Filed: Mar. 18, 2016

(86) PCT No.: PCT/US2016/023015
§ 371 (c)(1),
(2) Date: Sep. 20, 2017

(87) PCT Pub. No.: WO2016/153955
PCT Pub. Date: Sep. 29, 2016

(65) Prior Publication Data
US 2018/0073410 A1    Mar. 15, 2018

Related U.S. Application Data

(60) Provisional application No. 62/158,813, filed on May 8, 2015, provisional application No. 62/136,917, filed on Mar. 23, 2015.

(51) Int. Cl.
*B01D 46/24*    (2006.01)
*F01N 3/021*    (2006.01)
(Continued)

(52) U.S. Cl.
CPC ....... *F01N 3/2842* (2013.01); *B01D 46/2444* (2013.01); *B01D 46/2459* (2013.01);
(Continued)

(58) Field of Classification Search
CPC ........... B01D 46/2444; B01D 46/2422; B01D 53/94; F01N 3/2842; C04B 38/0006; B01J 35/04
(Continued)

(56) References Cited

U.S. PATENT DOCUMENTS

| | | |
|---|---|---|
| 3,441,381 A | 4/1969 | Keith et al. |
| 3,441,382 A | 4/1969 | Keith et al. |

(Continued)

FOREIGN PATENT DOCUMENTS

| | | |
|---|---|---|
| CN | 202778756 U | 3/2013 |
| DE | 10032023 A1 | 1/2002 |

(Continued)

OTHER PUBLICATIONS

International Search Report of the International Searching Authority; PCT/US2016/023015; dated Jun. 22, 2016; 12 Pages; European Patent Office.
(Continued)

*Primary Examiner* — Tri V Nguyen

(57) ABSTRACT

An article, includes a porous ceramic honeycomb body and a housing disposed on at least one of an outer periphery of the porous ceramic honeycomb body and opposing end faces of the porous ceramic honeycomb body, wherein the housing exerts a compressive force on the porous ceramic honeycomb body in at least one of radial direction and axial direction. A method of making the article, includes heating to greater than or equal to about 200 C the housing, crimping the housing tightly around the honeycomb body while the housing is greater than or equal to about 200 C, and cooling the housing. The housing exerts a compressive force on the
(Continued)

porous ceramic honeycomb body in at least one of radial direction and axial direction by shrinking on cooling more than the honeycomb body.

19 Claims, 8 Drawing Sheets

(51) Int. Cl.
*B01J 35/04* (2006.01)
*F01N 3/28* (2006.01)
*B01D 53/94* (2006.01)
*C04B 38/00* (2006.01)
*F01N 3/022* (2006.01)

(52) U.S. Cl.
CPC .............. *B01D 53/94* (2013.01); *B01J 35/04* (2013.01); *C04B 38/0006* (2013.01); *F01N 3/0211* (2013.01); *F01N 3/0222* (2013.01); *F01N 3/2828* (2013.01); *F01N 3/2878* (2013.01); *B01D 2046/2492* (2013.01); *B01D 2279/30* (2013.01); *F01N 2330/06* (2013.01); *F01N 2350/02* (2013.01); *F01N 2350/04* (2013.01); *Y02T 10/20* (2013.01)

(58) Field of Classification Search
USPC ....................................... 428/116; 502/527.23
See application file for complete search history.

(56) References Cited

U.S. PATENT DOCUMENTS

| | | |
|---|---|---|
| 3,645,092 A | 2/1972 | Tatsutomi et al. |
| 3,653,205 A | 4/1972 | Tadokoro |
| 3,801,289 A | 4/1974 | Wiley |
| 3,817,714 A | 6/1974 | Wiley |
| 3,841,842 A | 10/1974 | Wiley |
| 3,852,042 A | 12/1974 | Wagner |
| 3,854,888 A | 12/1974 | Frietzsche et al. |
| 3,925,026 A | 12/1975 | Bray et al. |
| 3,945,803 A | 3/1976 | Musall et al. |
| 3,947,252 A | 3/1976 | Musall et al. |
| 3,948,533 A | 4/1976 | Novosad |
| 3,984,207 A | 10/1976 | Abthoff et al. |
| 4,004,887 A | 1/1977 | Stormont |
| 4,004,888 A | 1/1977 | Musall et al. |
| 4,021,203 A | 5/1977 | Givens et al. |
| 4,143,117 A | 3/1979 | Gaysert |
| 4,145,394 A | 3/1979 | Abthoff et al. |
| 4,163,041 A | 7/1979 | Gaysert |
| 4,353,873 A | 10/1982 | Noritake et al. |
| 4,362,700 A | 12/1982 | Hayashi et al. |
| 4,396,664 A | 8/1983 | Mochida et al. |
| 4,432,943 A | 2/1984 | Musall et al. |
| 4,759,110 A | 7/1988 | Rieger et al. |
| 5,082,479 A | 1/1992 | Miller |
| 5,106,434 A | 4/1992 | Ishida et al. |
| 5,468,384 A | 11/1995 | Garcera et al. |
| 5,597,503 A | 1/1997 | Anderson et al. |
| 5,599,509 A | 2/1997 | Toyao et al. |
| 5,866,079 A | 2/1999 | Machida et al. |
| 6,274,099 B1 | 8/2001 | Maus et al. |
| 6,284,332 B1 | 9/2001 | Buettner et al. |
| 6,316,384 B1* | 11/2001 | Bruck ................ B01D 53/9454 502/439 |
| 6,875,407 B1 | 4/2005 | Biel, Jr. et al. |
| 6,884,398 B1 | 4/2005 | Beil, Jr. et al. |
| 7,093,431 B2 | 8/2006 | Balle et al. |
| 7,255,538 B2 | 8/2007 | Shi |
| 7,297,174 B2 | 11/2007 | Geise et al. |
| 7,431,896 B2 | 10/2008 | Biel, Jr. et al. |
| 7,575,726 B2 | 8/2009 | Carroll et al. |
| 7,611,561 B2 | 11/2009 | Hill, Jr. et al. |
| 8,147,763 B2 | 4/2012 | Maus |
| 8,225,476 B2 | 7/2012 | Mayfield |
| 8,522,828 B2 | 9/2013 | Merry |
| 8,661,672 B2 | 3/2014 | Cantele et al. |
| 8,721,977 B2 | 5/2014 | Wikaryasz et al. |
| 8,752,290 B2 | 6/2014 | Myers |
| 9,670,814 B2 | 6/2017 | Sako |
| 2001/0046457 A1 | 11/2001 | Zidat et al. |
| 2002/0168304 A1* | 11/2002 | Boehnke ................ F01N 3/28 422/179 |
| 2003/0039595 A1 | 2/2003 | Geise |
| 2005/0207948 A1 | 9/2005 | Borneby |
| 2006/0103876 A1 | 5/2006 | Weinans |
| 2007/0011874 A1 | 1/2007 | Myers |
| 2008/0131335 A1 | 6/2008 | Balk et al. |
| 2008/0241007 A1 | 10/2008 | Hardesty |
| 2008/0263866 A1 | 10/2008 | Mayfield |
| 2009/0029104 A1* | 1/2009 | Iwata ................ B01D 46/2448 428/116 |
| 2009/0110875 A1* | 4/2009 | Earl .................... B01D 46/2429 428/116 |
| 2010/0062213 A1 | 3/2010 | Kondo |

FOREIGN PATENT DOCUMENTS

| | | |
|---|---|---|
| DE | 10035194 A1 | 2/2002 |
| EP | 2746549 B1 | 11/2014 |
| FR | 2936009 A1 | 3/2010 |
| GB | 1436244 A | 5/1976 |
| JP | 2211959 A | 8/1990 |
| JP | 10000337 A | 1/1998 |
| JP | 02888350 B2 | 5/1999 |
| JP | 2002021554 A | 1/2002 |
| JP | 2002227633 A | 8/2002 |
| JP | 2002227640 A | 8/2002 |
| JP | 2005282374 A | 10/2005 |
| JP | 2005282375 A | 10/2005 |
| JP | 2007315246 A | 12/2007 |
| JP | 2008215337 A | 9/2008 |
| JP | 2011149338 A | 8/2011 |
| JP | 2012193726 A | 10/2012 |
| JP | 2014213232 A | 11/2014 |

OTHER PUBLICATIONS

Bauman et al; "Relationship Between Substrate Mounting Materials and Diesel Substrate and Shell Surface Temperatures: On-Engine Experimental Testing and Thermal Modeling"; SAE Technical Papers; 2007-07-1119; Apr. 16-19, 2007; 12 Pages.

* cited by examiner

EXHAUST GAS TREATMENT ARTICLE AND METHODS OF MANUFACTURING SAME

CROSS REFERENCE TO RELATED APPLICATIONS

This application is a national stage application under 35 U.S.C. § 371 of International Patent Application Serial No. PCT/US2016/023015 filed on Mar. 18, 2016, which claims the benefit of priority of U.S. Provisional Patent Application No. 62/136,917, filed on Mar. 23, 2015, and U.S. Provisional Patent Application No. 62/158,813, filed on May 8, 2015, all of which are relied upon and incorporated herein by reference in their entireties.

BACKGROUND

Field

Exemplary embodiments of the present disclosure relate to articles and methods of manufacturing the same and, more particularly, to exhaust gas treatment article having a porous ceramic honeycomb body in a housing, and methods of manufacturing the same.

Discussion of the Background

After-treatment of exhaust gas from internal combustion engines may use catalysts supported on high-surface area substrates and, in the case of diesel engines and some gasoline direct injection engines, a catalyzed or non-catalyzed filter for the removal of carbon soot particles. Porous ceramic flow-through honeycomb substrates and wall-flow honeycomb filters may be used in these applications.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide an exhaust gas treatment article.

Exemplary embodiments of the present disclosure also provide a method of making an exhaust gas treatment article.

Additional features of the disclosure will be set forth in the description which follows, and in part will be apparent from the description, or may be learned by practice of the disclosure.

An exemplary embodiment discloses an article. The article includes a porous ceramic honeycomb body and a housing disposed on the porous ceramic honeycomb body. The porous ceramic honeycomb body has a plurality of channel walls extending from opposing end faces defining cell channels therebetween, and an outer periphery extending from one end face to the other. The housing is disposed on at least one of the outer periphery of the porous ceramic honeycomb body and the opposing end faces of the porous ceramic honeycomb body. The housing exerts a compressive force on the porous ceramic honeycomb body in at least one of radial direction and axial direction.

An exemplary embodiment also discloses a method of making an article. The method includes heating to greater than or equal to about 200° C. at least one of a housing and a housing together with a porous ceramic honeycomb body, tightening the housing firmly around the honeycomb body while the housing is greater than or equal to about 200° C., and cooling the housing wherein the housing exerts a compressive force on the porous ceramic honeycomb body in at least one of radial direction and axial direction by shrinking on cooling.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
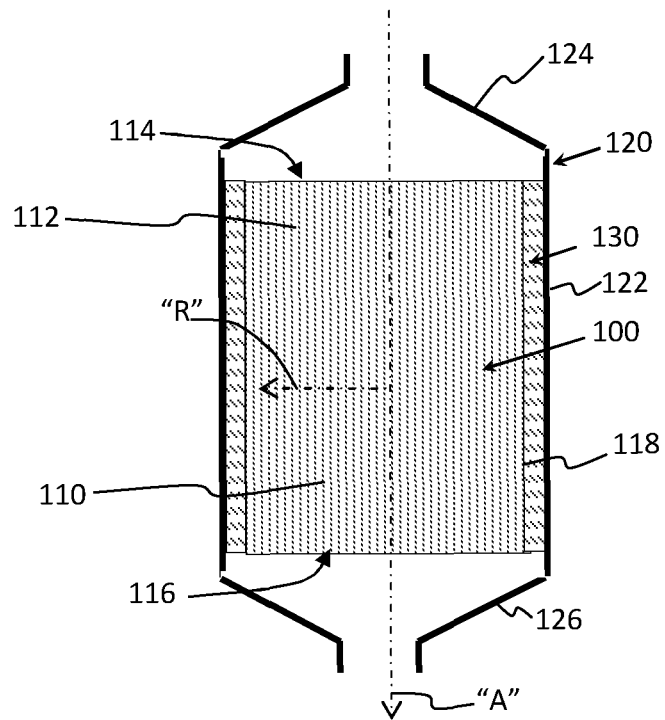
FIG. 1 presents a schematic cross sectional view of a conventional arrangement of a honeycomb body canned with a mat.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

In these exemplary embodiments, the disclosed article, and the disclosed method of making the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

Exemplary embodiments of the disclosure relate to an improved exhaust gas treatment article including a honeycomb body mounted in a metal housing, as well as an economical and efficient method for mounting a honeycomb body in a metal housing. The exhaust gas treatment article may be part of an exhaust gas treatment system to clean exhaust gases.

Auto, truck, and motorcycle, as well as stationary, catalytic converter honeycomb substrates and diesel filters (honeycomb bodies) can be mounted inside housings (cans). A fiber mat can be placed around the honeycomb body to minimize the effects of vibration and movement. As the honeycomb body and housing become hot and the metal housing expands in diameter and length, the mat acts as a buffer, taking up the additional space, thus protecting the honeycomb body from movement.

During long-term usage, temperature cycling and vibration can break down the integrity of the mat. Some mats are an expensive component in the exhaust system and can cost a customer almost as much as the honeycomb body. There are also potential problems of the mat decomposing and fibers from the mat plugging downstream parts of the exhaust system. Furthermore, the placement of the mat during canning processes can lead to manufacturing complications and inefficiencies.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. As used herein a ceramic honeycomb body includes ceramic honeycomb monoliths and ceramic segmented honeycomb bodies.

A co-extruded or an after-applied exterior skin may form an outer peripheral surface extending axially from a first end face to a second end face of the ceramic honeycomb bodies. Each channel of the honeycomb bodies defined by intersecting walls (webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalysts, catalyst supports, membrane supports, as wall-flow filters, as partial filters, and as combinations thereof for cleaning fluids such as engine exhausts.

Ceramic honeycomb body compositions are not particularly limited and can comprise major and minor amounts of cordierite, aluminum-titanate, mullite, $\beta$-spodumene, silicon carbide, zeolite and the like, and combinations thereof. As a further example, the ceramic honeycomb body can comprise an extruded zeolite or other extruded catalyst.

Ceramic honeycomb bodies may be disposed in a housing (can) in an exhaust system. The housing may be referred to as a can and the process of disposing the ceramic honeycomb body in the can may be referred to as canning.

FIG. 1 shows a schematic cross sectional view of a conventional arrangement of a honeycomb body canned with a mat. The honeycomb body 100 includes a plurality of intersecting walls 110 that form mutually adjoining cell channels 112 extending axially between opposing end faces 114, 116. The top face 114 refers to the first end face and the bottom face 116 refers to the second end face of the honeycomb body 100 positioned in FIG. 1, otherwise the end faces are not limited by the orientation of the honeycomb body 100. The top face 114 may be an inlet face and the bottom face 116 may be an outlet face of the honeycomb body 100 or the top face 114 may be an outlet face and the bottom face 116 may be an inlet face of the honeycomb body 100. The outer peripheral surface 118 of the honeycomb body 100 extends axially from the first end face 114 to the second end face 116.

Cell density can be between about 100 and 900 cells per square inch (cpsi). Typical cell wall thicknesses can range from about 0.025 mm to about 1.5 mm (about 1 to 60 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, and 900/2. As used herein, honeycomb body 100 is intended to include a generally honeycomb structure but is not strictly limited to a square structure. For example, hexagonal, octagonal, triangular, rectangular or any other suitable cell shape may be used. Also, while the cross section of the cellular honeycomb body 100 is circular, it is not so limited, for example, the cross section can be elliptical, square, rectangular, or other desired shape, and a combination thereof.

The housing (can) 120 includes an axial section 122 covering the outer peripheral surface 118 of the honeycomb body 100 and funnel-shaped first and second cones 124, 126 that may correspond to inlet and outlet of the exhaust gas treatment article. The housing 120 is generally fabricated of metal or other material that is impermeable to gases, and is configured to contain one or more honeycomb bodies 100. For example, the housing can comprise aluminum, stainless steel such as 400-series stainless steel or 300-series stainless steel, titanium alloy, titanium, and the like. Exhaust gases flow through the honeycomb body 100 in the general axial direction as indicated by arrow "A", including through the channels 112 that may or may not be catalyzed, and in the case of filters, through the channel walls 110. A mat 130 can be placed around the honeycomb body 100 to minimize the effects of vibration and movement.

Exemplary embodiments of the disclosure take advantage of differential coefficients of thermal expansion (CTE) between metal of the housing and ceramic of the honeycomb body disposed within the housing. Compression mounting of the honeycomb body in the metal can is done by heating, for example, to greater than or equal to 200-1000° C. and above the maximum skin temperature that the honeycomb body experiences in exhaust system operation. The metal housing having a first CTE, for example, of greater than or equal to about $80 \times 10^{-7}$ cm/cm/° C., is disposed on the honeycomb body having a second CTE, for example, less than or equal to about $45 \times 10^{-7}$ cm/cm/° C., lower than the first CTE. For example, the first CTE can be between about 80 and $200 \times 10^{-7}$ cm/cm/° C. For example, the second CTE can be between about 45 and $-10 \times 10^{-7}$ cm/cm/° C. The housing and honeycomb body in the housing are heated or are brought together at the high temperature and the metal housing is compressed tightly around the substrate, then the metal housing and honeycomb body assembly is allowed to cool to room temperature to form an exhaust gas treatment article.

In an exemplary embodiment, compression mounting of the honeycomb body in the housing can be achieved by placing a honeycomb body in a metal sleeve at high temperature to form the housing on the honeycomb body from the sleeve. When the metal housing and honeycomb body cool, the honeycomb body will be tightly held by the metal can radial compression to form the exhaust gas treatment article. Heating the housing or heating the housing and the honeycomb body to fit them together and then cooling the housing to form the exhaust gas treatment article may be referred to as shrink-fitting and the honeycomb body can be referred to as shrink-fit in the housing. The metal sleeve can be the same length as the honeycomb body in the axial direction, greater length than the honeycomb body in the axial direction, or less length than the honeycomb body in the axial direction. Also, one or more honeycomb bodies may be held in the housing. Furthermore, in these exemplary embodiments, the one or more honeycomb bodies disposed in the housing can be disposed in a second housing and the second housing adapted to an exhaust gas system to flow exhaust gas through the honeycomb body.

In an exemplary embodiment, compression mounting of the honeycomb body in the housing can be achieved by placing a honeycomb body in a sheet metal wrap to form the housing on the honeycomb body from the sheet metal wrap, heating this wrap assembly to high temperature, for example, to greater than or equal to 400-800° C. above maximum skin temperature that the honeycomb body experiences in exhaust system operation to expand the sheet metal wrap, crimping the sheet metal wrap tightly around the honeycomb body and then welding the sheet metal wrap at an overlap seam. Herein crimping refers to tightening the sheet metal wrap around the honeycomb body, for example, by swaging, the tightened sheet metal wrap can then be tack welded in place or other similar seam can be made. In these exemplary embodiments, when the metal housing and honeycomb body cool, the honeycomb body will be tightly held by the metal can radial compression when the metal housing is disposed on the honeycomb body outer peripheral surface. Similarly, the honeycomb body will be tightly held by the metal can axial compression when the metal housing is disposed on the honeycomb body faces.

In these exemplary embodiments, a mat may be disposed between the housing and the honeycomb body. Alternatively, in these exemplary embodiments, there may be no mat disposed between the housing and the honeycomb body.

Figure 2A:
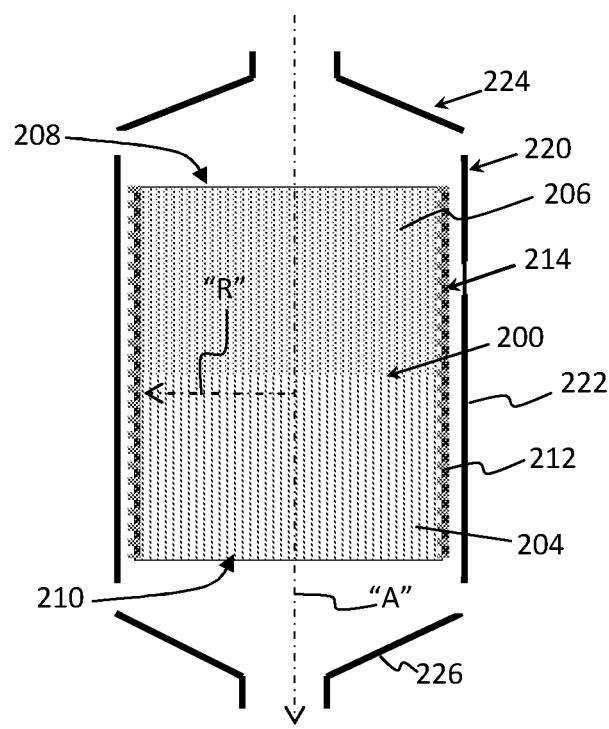
FIGS. 2A and 2B present a schematic cross sectional view of a coefficient of thermal expansion (CTE) canning process and a canned honeycomb body forming an article according to an exemplary embodiment of the disclosure.
Figure 2B:
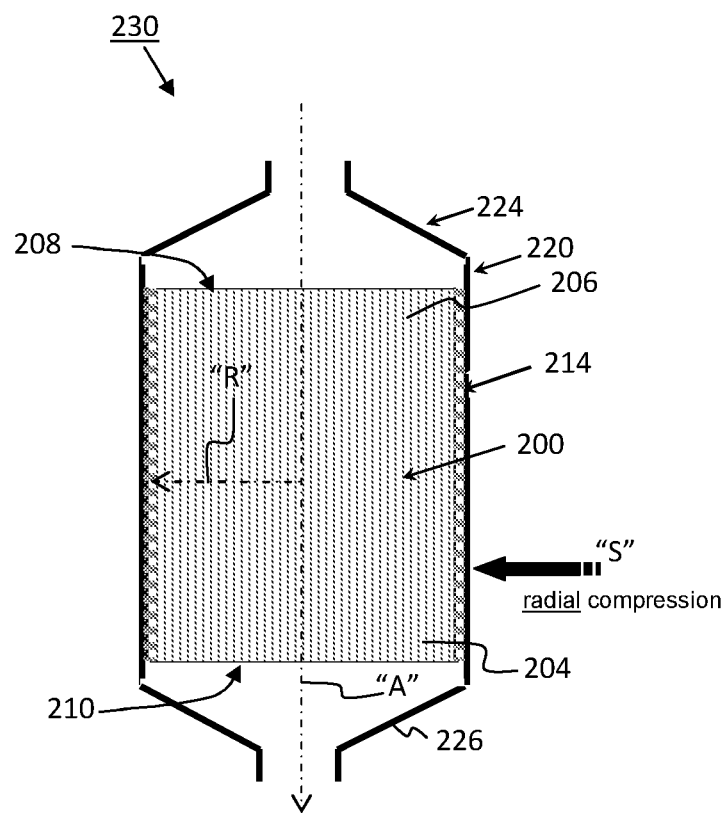

FIGS. 2A and 2B present a schematic cross sectional view of a coefficient of thermal expansion (CTE) canning process and a canned honeycomb body forming an exhaust gas treatment article according to an exemplary embodiment of the disclosure. The honeycomb body 200 includes a plurality of intersecting walls 204 that form mutually adjoining cell channels 206 extending axially between opposing end faces 208, 210. The outer peripheral surface 212 of the honeycomb body 200 extends axially from the first end face 208 to the second end face 210. Honeycomb body 200 in FIGS. 2A and 2B comprises a strong ceramic skin 214. The strong ceramic skin 214 can be composed of a cement having a high strength, a cement layer having a high thickness, or the like, and a combination thereof. The strong ceramic skin 214 can have a modulus of rupture (MOR) of >300 psi, for example, in some embodiments >800 psi, >1200 psi, or even >3000 psi. The honeycomb body 200 is disposed in the metal housing 220 axial section 222, for example, a metal sleeve. The housing axial section 222 having the honeycomb body 200 disposed therein can be heated to expand the housing axial section 222. In alternative embodiments the housing axial section 222 can be heated to expand to allow the honeycomb body 200 to be disposed within the housing axial section 222. Heating can be heating to a high temperature, for example, to greater than or equal to about 200° C. and above the maximum skin 214 temperature experienced by the honeycomb body 200 during in-service operation of the exhaust system. For example, the high temperature may be greater than or equal to about 200° C. to 800° C. and above the maximum skin 214 temperature experienced by the honeycomb body 200 during in-service operation of the exhaust system.

At the high temperature, the housing axial portion 222 can be crimped tightly around the honeycomb body 200. Crimping may include forming a seam in the housing axial section 222. The housing axial section 222 having the honeycomb body 200 disposed within the crimped housing axial section 222 can be cooled to secure the honeycomb body 200 within the housing axial section 222 by the greater contraction of the housing axial section 222 than the honeycomb body 200 due to the higher CTE of the housing axial section 222 to form the exhaust gas treatment article 230. The housing axial section 222 thus imparts a radial compressive force, for example, in direction "R", to the honeycomb body 200 at the outer peripheral surface 212. In some of these embodiments, the outer peripheral surface 212 may have the strong ceramic skin 214 disposed thereon. In some of these exemplary embodiments, there may be no skin disposed on the honeycomb body outer peripheral surface 212 such that the housing axial section 222 functions as a skin for the honeycomb body 200.

The metal housing 220 of the exhaust gas treatment article 230 can exert a compression force of >200 psi at 25° C. and <100 psi at 200° C. and above on the honeycomb body 200 mounted inside of the metal housing 220. For example, the metal housing 220 can exert a compression force of >200 psi at 25° C. and <100 psi at 400° C. and above on the honeycomb body 200. The metal housing 220 can exert a compression force of >200 psi at 25° C. and <100 psi at 600° C. on the honeycomb body 200. The compressive force can be at least one of radial and axial.

Funnel-shaped first and second cones 224, 226 that may correspond to inlet and outlet of the exhaust gas treatment article can be disposed on opposing ends of the exhaust gas treatment article 230 as shown in FIGS. 2A and 2B. In some exemplary embodiments, the housing axial section 222 may be disposed within a second housing and the funnel-shaped first and second cones 224, 226 may be disposed on opposing ends of the second housing to adapt an exhaust gas flow through the honeycomb body 200.

The exhaust gas may be purified on passing through the honeycomb body 200 and exit the honeycomb body 200 at the second end face 210, pass through the funnel-shaped cone 226 and exit an outlet of the exhaust gas treatment article 230. The exhaust gas may then pass through other components of an exhaust system, such as a muffler, tail pipe, and the like or the exhaust gas may exit the exhaust system at the outlet of the exhaust gas treatment article 230.

Figure 3:
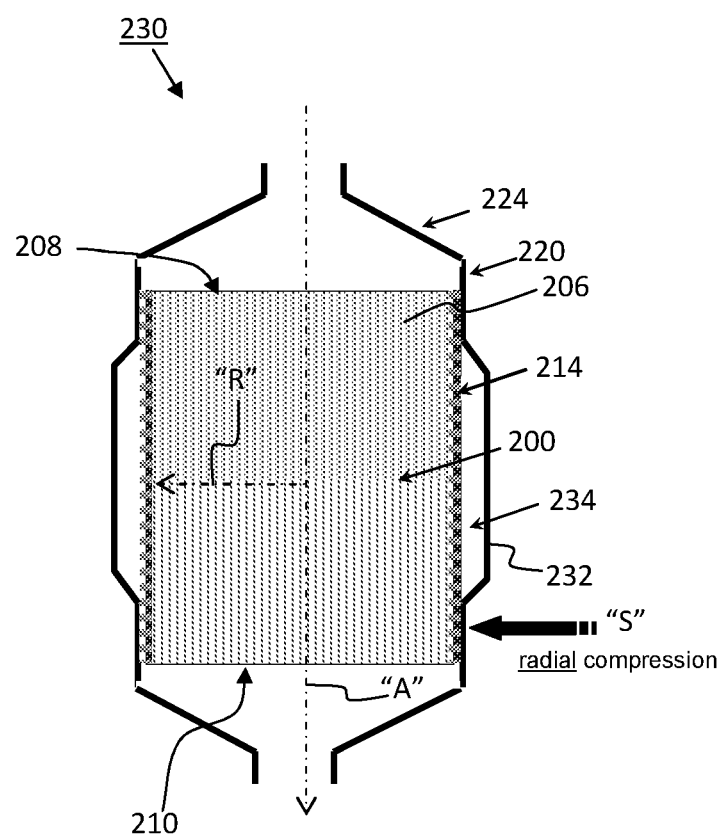
FIG. 3 presents a schematic cross sectional view of a canned honeycomb body forming an article according to an exemplary embodiment of the disclosure.

FIG. 3 presents a schematic cross sectional view of a canned honeycomb body forming an exhaust gas treatment article according to an exemplary embodiment of the disclosure. The housing axial section 222 as described herein may comprise an outward bump 232 to provide a gap 234 between the outer peripheral surface 212 of the honeycomb body 200 and an inner surface of the housing axial section 222. The gap 234 can provide a space for a mat or, alternatively, a space without a mat between the outer peripheral surface 212 of the honeycomb body 200 and an inner surface of the housing axial section 222.

The exhaust gas treatment article 230 of FIG. 3 may be made in the same or similar way as already described with reference to FIGS. 2A and 2B. However, in crimping the housing axial portion 222 tightly around the honeycomb body 200, a gap 234 can be provided at least partially around the honeycomb body 200 and at least partially along the axial direction. The gap 234 is formed to remain when the honeycomb body 200 within the housing axial section 222 and the housing axial section 222 or only the housing axial section 222 having the honeycomb body disposed therein is cooled to form the exhaust gas treatment article 230.

Figure 4A:
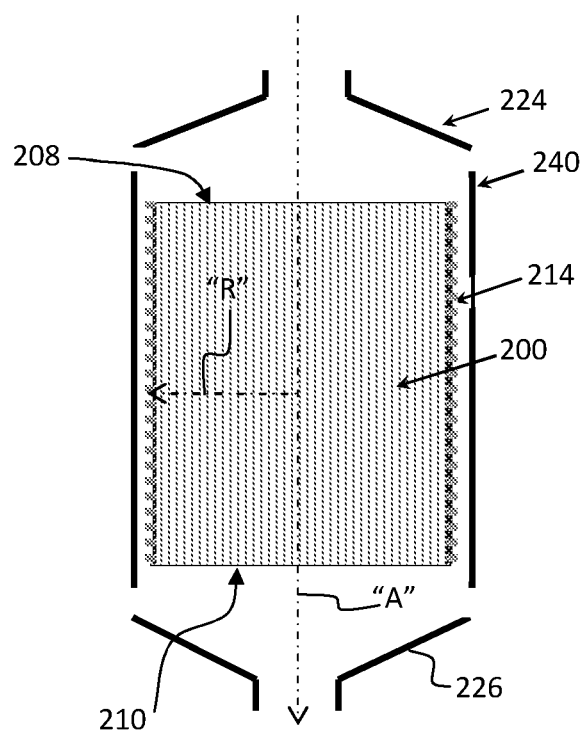
FIGS. 4A and 4B present a schematic cross sectional view of a CTE canning process and a canned honeycomb body forming an exhaust gas treatment article according to an exemplary embodiment of the disclosure.
Figure 4B:
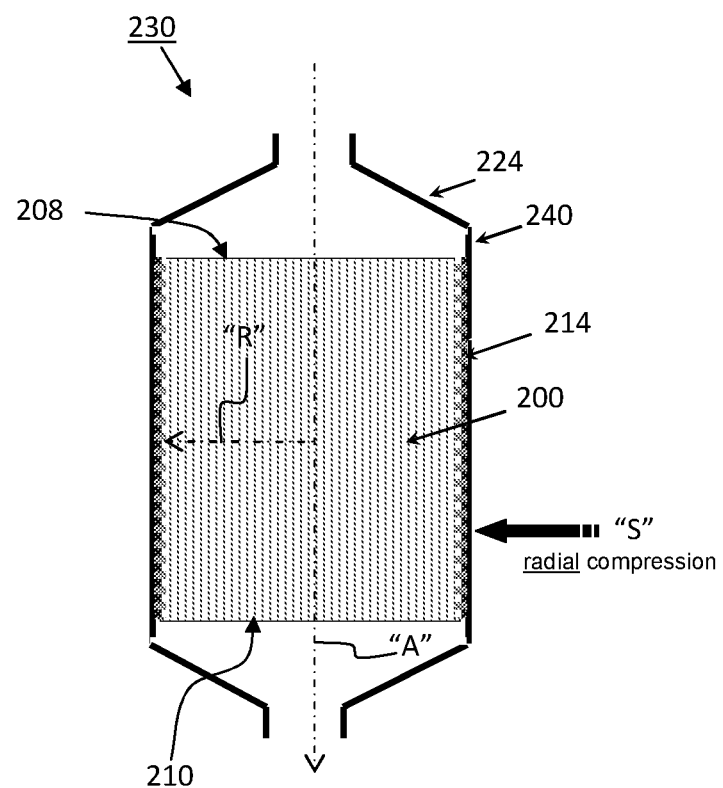

FIGS. 4A and 4B present a schematic cross sectional view of a CTE canning process and a canned honeycomb body forming an exhaust gas treatment article according to an exemplary embodiment of the disclosure. Accordingly, compression mounting of the honeycomb body 200 in the housing 220 can be achieved by placing a honeycomb body 200 in a sheet metal wrap 240 to form the housing 220 on the honeycomb body 200 from the sheet metal wrap 240, heating this wrap assembly to high temperature, for example, to greater than or equal to 400-800° C. and above a maximum skin temperature that the honeycomb body 200 experiences in exhaust system operation to expand the sheet metal wrap 240, crimping the sheet metal wrap tightly around the honeycomb body 200 and then welding the sheet metal wrap 240 at an overlap seam. In these exemplary embodiments, when the metal housing 220 and honeycomb body 200 cool, the honeycomb body 200 will be tightly held by the metal can 220 radial compression "S" when the metal housing 220 is disposed on the honeycomb body outer peripheral surface 212 to form the exhaust gas treatment article 230.

Figure 5:
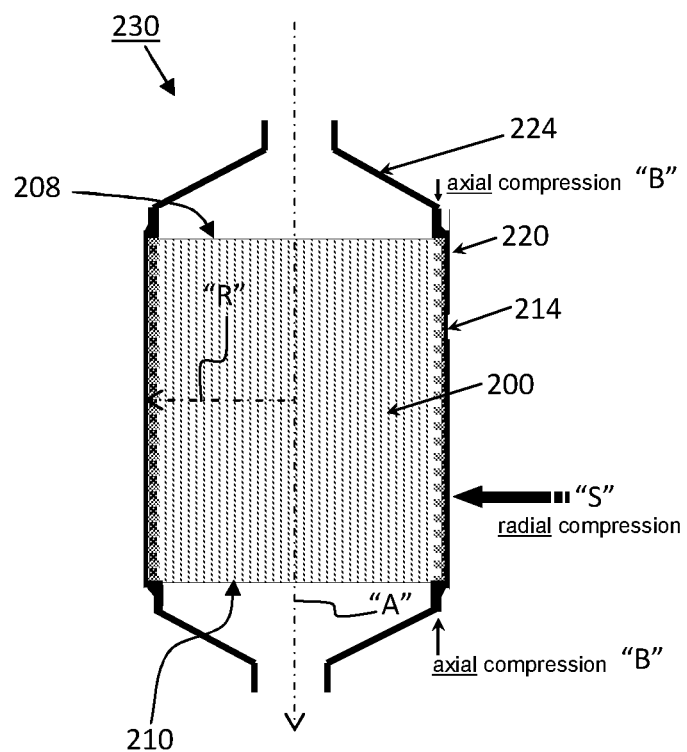
FIG. 5 presents a schematic cross sectional view of a canned honeycomb body forming an article according to an exemplary embodiment of the disclosure.

FIG. 5 presents a schematic cross sectional view of a canned honeycomb body forming an exhaust gas treatment article according to an exemplary embodiment of the disclosure. Accordingly, compression mounting of the honeycomb body 200 in the housing 220 can be achieved by placing a honeycomb body 200 in a sheet metal wrap 240 to form the housing 220 on the honeycomb body 200 from the sheet metal wrap 240, heating this wrap assembly to high temperature, for example, to greater than or equal to 400-800° C. above maximum skin temperature that the honeycomb body 200 experiences in exhaust system operation to expand the sheet metal wrap 240, crimping the sheet metal wrap tightly around the honeycomb body 200, including at least a portion of the end faces 208, 210 and then welding the sheet metal wrap 240 at an overlap seam. The portion of the end faces 208, 210 can be an outer peripheral portion. In these exemplary embodiments, when the metal housing 220 and honeycomb body 200 cool, the honeycomb body 200 will be tightly held by the metal can 220 axial compression "B" when the metal housing 220 is disposed on the at least a portion of the end faces 208, 210 of the honeycomb body 200 to form the exhaust gas treatment article 230. In these exemplary embodiments, when the metal housing 220 and honeycomb body 200 cool, the honeycomb body 200 can be tightly held by the metal can 220 radial compression, as well, when the metal housing 220 is disposed on the honeycomb body outer peripheral surface 212 to form the exhaust gas treatment article 230.

Figure 6:
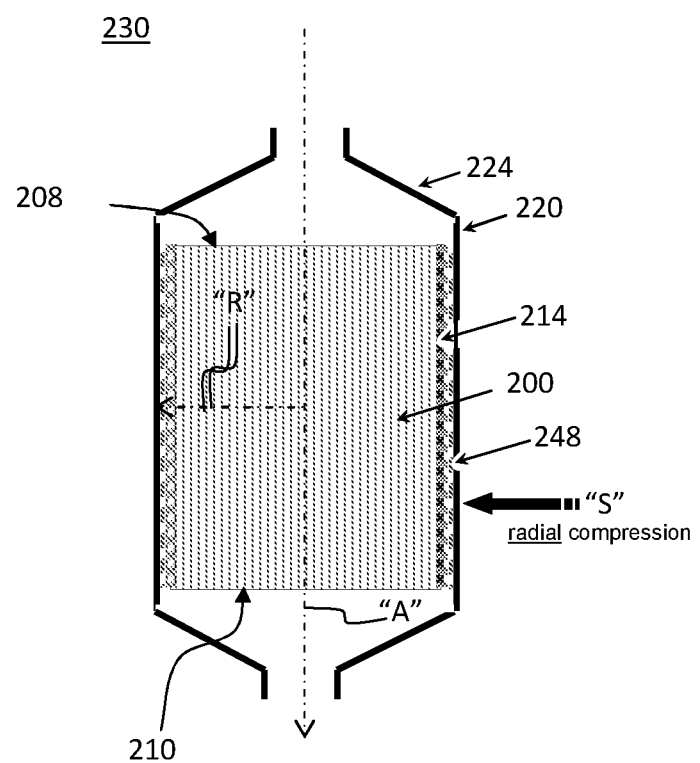
FIG. 6 shows a schematic cross sectional view of a canned honeycomb body forming an article according to an exemplary embodiment of the disclosure.

FIG. 6 shows a schematic cross sectional view of a canned honeycomb body forming an exhaust gas treatment article according to an exemplary embodiment of the disclosure. The honeycomb body 200 as described herein may comprise a thin sheet (i.e., sheet, film, layer, or the like) 246 disposed on the outer peripheral surface 212 to provide a gap 248 between the outer peripheral surface 212 of the honeycomb body 200 and an inner surface of the housing axial section 222. The process of forming the exhaust gas treatment article 230 as shown in FIG. 6 are similar to those exemplary embodiments as described herein above and will not be repeated in further detail.

The thin sheet 246 can be about 5 to about 100 microns thick and be comprised of, for example, polymer, carbon paint, aluminum tape, foamed glass, ceramic powder, or the like and a combination thereof. The thin sheet 246 creates gap 248, however, the gap 248 can be created by other processes according to exemplary embodiments of the disclosure. For example, mechanically controlling the crimping distance of the housing axial section 222 around the honeycomb body 200. The thin sheet 246 can be burned away or chemically removed to leave the gap 248. In the case of a weak porous glass or ceramic powder, for example, expanded pearlite, or fibers, the thin sheet 246 can be crushed thus leaving the gap 248. The gap can control the level of compression exerted by the housing 220 on the honeycomb body 200. While the thin sheet 246 has been described with respect to a radial direction, the disclosure includes the thin sheet 246 applied to a portion of end faces 208, 210 to control axial compression exerted by the housing 220 on the honeycomb body 200.

According to these exemplary embodiments, the housing 220 of the exhaust gas treatment article 230 can be in direct contact with the outer peripheral surface 212 and/or the end faces 208, 210 of the honeycomb body 200 at 25° C. Further, the housing 220 of the exhaust gas treatment article 230 can be in direct contact with the outer peripheral surface 212 and/or the end faces 208, 210 of the honeycomb body 200 at 25° C. and have an average gap 248 of about 1-100 microns between the housing 220 and the outer peripheral surface 212 and/or the end faces 208, 210 at about 400° C. For example, the housing 220 can be in direct contact with the honeycomb body 200 at 25° C. and have an average gap 248 of about 1-100 microns between the housing 220 and the honeycomb body at about 600° C. As an even further example, the housing 220 can be in direct contact with the honeycomb body 200 at 25° C. and have an average gap 248 of about 1-100 microns between the housing 220 and the honeycomb body at about 800° C.

EXAMPLES

Exemplary embodiments of the disclosure are further described below with respect to certain exemplary and specific embodiments thereof, which are illustrative only and not intended to be limiting. In accordance with some of the embodiments, as provided in Tables 1-3, a series of modeled examples are provided for honeycomb bodies comprising cordierite, aluminum titanate, and SiC, cell geometries of 900 cells per square inch (cpsi) and 2 mil thick walls (900/2) and 300/12, 15.2 cm long by 14.4 cm diameter (6"×5.66") and 27.9 cm long by 27.9 cm diameter (11"×11"), canned with 410 or 310 stainless steel. Canning temperatures from 200° C. to 1000° C. were used. A gap of 0 to 85 microns was used between the can and the honeycomb body when the can was crimped around the substrate at temperature in order to control the canning pressure.

TABLE 1

| Example | Honeycomb Material | CTE_honeycomb (alpha_c), cm/cm/° C. | Cells/in² | Web thickness, mils | Length (at 25° C.), cm | Diameter (at 25° C.), cm | Metal housing material |
|---|---|---|---|---|---|---|---|
| 1 | cordierite | 3E−07 | 900 | 2 | 15.2 | 14.4 | 410 SS |
| 2 | cordierite | 3E−07 | 900 | 2 | 15.2 | 14.4 | 410 SS |
| 3 | cordierite | 3E−07 | 900 | 2 | 15.2 | 14.4 | 410 SS |
| 4 | cordierite | 3E−07 | 900 | 2 | 15.2 | 14.4 | 410 SS |
| 5 | cordierite | 3E−07 | 900 | 2 | 15.2 | 14.4 | 410 SS |
| 6 | cordierite | 3E−07 | 900 | 2 | 15.2 | 14.4 | 410 SS |
| 7 | cordierite | 3E−07 | 900 | 2 | 15.2 | 14.4 | 410 SS |
| 8 | cordierite | 3E−07 | 900 | 2 | 15.2 | 14.4 | 410 SS |
| 9 | cordierite | 3E−07 | 900 | 2 | 15.2 | 14.4 | 410 SS |
| 10 | cordierite | 3E−07 | 900 | 2 | 15.2 | 14.4 | 410 SS |
| 11 | cordierite | 3E−07 | 900 | 2 | 15.2 | 14.4 | 410 SS |
| 12 | cordierite | 3E−07 | 900 | 2 | 15.2 | 14.4 | 410 SS |
| 13 | cordierite | 3E−07 | 900 | 2 | 15.2 | 14.4 | 410 SS |
| 14 | cordierite | 3E−07 | 900 | 2 | 15.2 | 14.4 | 310 SS |
| 15 | cordierite | 3E−07 | 900 | 2 | 15.2 | 14.4 | 310 SS |
| 16 | cordierite | 3E−07 | 900 | 2 | 15.2 | 14.4 | 310 SS |
| 17 | cordierite | 3E−07 | 900 | 2 | 15.2 | 14.4 | 310 SS |
| 18 | cordierite | 3E−07 | 900 | 2 | 15.2 | 14.4 | 310 SS |
| 19 | cordierite | 3E−07 | 900 | 2 | 15.2 | 14.4 | 310 SS |
| 20 | cordierite | 3E−07 | 900 | 2 | 15.2 | 14.4 | 310 SS |
| 21 | cordierite | 8.0E−07 | 300 | 12 | 15.2 | 14.4 | 410 SS |
| 22 | cordierite | 8.0E−07 | 300 | 12 | 15.2 | 14.4 | 410 SS |
| 23 | cordierite | 8.0E−07 | 300 | 12 | 15.2 | 14.4 | 410 SS |
| 24 | cordierite | 1.0E−06 | 300 | 12 | 27.9 | 27.9 | 410 SS |
| 25 | cordierite | 1.0E−06 | 300 | 12 | 27.9 | 27.9 | 410 SS |
| 26 | cordierite | 1.0E−06 | 300 | 12 | 27.9 | 27.9 | 410 SS |
| 27 | cordierite | 1.0E−06 | 300 | 12 | 27.9 | 27.9 | 410 SS |
| 28 | cordierite | 1.0E−06 | 300 | 12 | 27.9 | 27.9 | 410 SS |
| 29 | cordierite | 1.0E−06 | 300 | 12 | 27.9 | 27.9 | 410 SS |
| 30 | Aluminum titanate | 1.2E−06 | 300 | 12 | 15.2 | 14.4 | 310 SS |
| 31 | Aluminum titanate | 1.2E−06 | 300 | 12 | 15.2 | 14.4 | 310 SS |
| 31 | SiC | 4.0E−06 | 300 | 12 | 15.2 | 14.4 | 310 SS |
| 32 | SiC | 4.0E−06 | 300 | 12 | 15.2 | 14.4 | 310 SS |

TABLE 2

| Example | Metal thickness, mm | CTE_honeycomb (alpha_m), cm/cm/° C. | Temperature when crimped, ° C. | Length when crimped at Temp-T (substrate and metal), cm | Length when crimped (substrate and metal), cm | Length_metal without ceramic, cm | Gap layer between metal and ceramic when crimped, cm |
|---|---|---|---|---|---|---|---|
| 1 | 1.3 | 9.90E−06 | 200 | 15.241 | 15.240 | 15.214 | 0.000 |
| 2 | 1.3 | 9.90E−06 | 300 | 15.241 | 15.240 | 15.200 | 0.000 |
| 3 | 1.3 | 9.90E−06 | 400 | 15.242 | 15.240 | 15.185 | 0.000 |
| 4 | 1.3 | 9.90E−06 | 500 | 15.242 | 15.240 | 15.170 | 0.000 |

TABLE 2-continued

| Example | Metal thickness, mm | CTE_honeycomb (alpha_m), cm/cm/° C. | Temperature when crimped, ° C. | Length when crimped at Temp-T (substrate and metal), cm | Length when crimped (substrate and metal), cm | Length_metal without ceramic, cm | Gap layer between metal and ceramic when crimped, cm |
|---|---|---|---|---|---|---|---|
| 5 | 1.3 | 9.90E−06 | 600 | 15.243 | 15.240 | 15.156 | 0.000 |
| 6 | 1.3 | 9.90E−06 | 700 | 15.243 | 15.240 | 15.141 | 0.000 |
| 7 | 1.3 | 9.90E−06 | 800 | 15.244 | 15.240 | 15.127 | 0.000 |
| 8 | 1.3 | 9.90E−06 | 1000 | 15.244 | 15.240 | 15.097 | 0.000 |
| 9 | 1.3 | 9.90E−06 | 200 | 15.241 | 15.240 | 15.214 | 0.0010 |
| 10 | 1.3 | 9.90E−06 | 400 | 15.242 | 15.240 | 15.185 | 0.0028 |
| 11 | 1.3 | 9.90E−06 | 600 | 15.243 | 15.240 | 15.156 | 0.0046 |
| 12 | 1.3 | 9.90E−06 | 800 | 15.244 | 15.240 | 15.127 | 0.0067 |
| 13 | 1.3 | 9.90E−06 | 1000 | 15.244 | 15.240 | 15.097 | 0.0085 |
| 14 | 1.3 | 1.44E−05 | 200 | 15.241 | 15.240 | 15.202 | 0.000 |
| 15 | 1.3 | 1.44E−05 | 400 | 15.242 | 15.240 | 15.159 | 0.000 |
| 16 | 1.3 | 1.44E−05 | 600 | 15.243 | 15.240 | 15.116 | 0.000 |
| 17 | 1.3 | 1.44E−05 | 800 | 15.244 | 15.240 | 15.073 | 0.000 |
| 18 | 1.3 | 1.44E−05 | 200 | 15.241 | 15.240 | 15.202 | 0.0018 |
| 19 | 1.3 | 1.44E−05 | 400 | 15.242 | 15.240 | 15.159 | 0.0045 |
| 20 | 1.3 | 1.44E−05 | 600 | 15.243 | 15.240 | 15.116 | 0.0073 |
| 21 | 1.3 | 9.90E−06 | 200 | 15.242 | 15.240 | 15.216 | 0.000 |
| 22 | 1.3 | 9.90E−06 | 400 | 15.245 | 15.240 | 15.188 | 0.000 |
| 23 | 1.3 | 9.90E−06 | 600 | 15.247 | 15.240 | 15.160 | 0.000 |
| 24 | 1.3 | 9.90E−06 | 200 | 27.945 | 27.940 | 27.896 | 0.000 |
| 25 | 1.3 | 9.90E−06 | 400 | 27.950 | 27.940 | 27.847 | 0.000 |
| 26 | 1.3 | 9.90E−06 | 600 | 27.956 | 27.940 | 27.797 | 0.000 |
| 27 | 1.3 | 9.90E−06 | 200 | 27.945 | 27.940 | 27.896 | 0.0009 |
| 28 | 1.3 | 9.90E−06 | 400 | 27.950 | 27.940 | 27.847 | 0.0027 |
| 29 | 1.3 | 9.90E−06 | 600 | 27.956 | 27.940 | 27.797 | 0.0045 |
| 30 | 1.3 | 1.44E−05 | 200 | 15.243 | 15.240 | 15.205 | 0.000 |
| 31 | 1.3 | 1.44E−05 | 400 | 15.247 | 15.240 | 15.165 | 0.0042 |
| 31 | 1.3 | 1.44E−05 | 200 | 15.251 | 15.240 | 15.212 | 0.000 |
| 32 | 1.3 | 1.44E−05 | 400 | 15.263 | 15.240 | 15.180 | 0.0033 |

TABLE 3

| Example | stored strain for metal (with ceramic) | Young's modulus metal at 25° C., MPa | Poisson's Ratio of metal, u | Young's modulus ceramic substrate at 25° C., MPa | Young's modulus ceramic substrate at 25° C., psi | Poisson's Ratio of ceramic u | Compressive Stress, MPa | Compressive Stress at 25° C., psi |
|---|---|---|---|---|---|---|---|---|
| 1 | 0.001680 | 2.00E+05 | 0.31 | 4.9E+03 | 7.1E+05 | 0.25 | 11.0 | 1,591 |
| 2 | 0.002640 | 2.00E+05 | 0.31 | 4.9E+03 | 7.1E+05 | 0.25 | 17.2 | 2,500 |
| 3 | 0.003600 | 2.00E+05 | 0.31 | 4.9E+03 | 7.1E+05 | 0.25 | 23.5 | 3,409 |
| 4 | 0.004560 | 2.00E+05 | 0.31 | 4.9E+03 | 7.1E+05 | 0.25 | 29.8 | 4,318 |
| 5 | 0.005520 | 2.00E+05 | 0.31 | 4.9E+03 | 7.1E+05 | 0.25 | 36.0 | 5,227 |
| 6 | 0.006480 | 2.00E+05 | 0.31 | 4.9E+03 | 7.1E+05 | 0.25 | 42.3 | 6,136 |
| 7 | 0.007440 | 2.00E+05 | 0.31 | 4.9E+03 | 7.1E+05 | 0.25 | 48.6 | 7,045 |
| 8 | 0.009360 | 2.00E+05 | 0.31 | 4.9E+03 | 7.1E+05 | 0.25 | 61.1 | 8,863 |
| 9 | 0.000680 | 2.00E+05 | 0.31 | 4.9E+03 | 7.1E+05 | 0.25 | 4.4 | 644 |
| 10 | 0.000800 | 2.00E+05 | 0.31 | 4.9E+03 | 7.1E+05 | 0.25 | 5.2 | 758 |
| 11 | 0.000920 | 2.00E+05 | 0.31 | 4.9E+03 | 7.1E+05 | 0.25 | 6.0 | 871 |
| 12 | 0.000740 | 2.00E+05 | 0.31 | 4.9E+03 | 7.1E+05 | 0.25 | 4.8 | 701 |
| 13 | 0.000860 | 2.00E+05 | 0.31 | 4.9E+03 | 7.1E+05 | 0.25 | 5.6 | 814 |
| 14 | 0.002468 | 2.00E+05 | 0.31 | 4.9E+03 | 7.1E+05 | 0.25 | 16.1 | 2,337 |
| 15 | 0.005288 | 2.00E+05 | 0.31 | 4.9E+03 | 7.1E+05 | 0.25 | 34.5 | 5,007 |
| 16 | 0.008108 | 2.00E+05 | 0.31 | 4.9E+03 | 7.1E+05 | 0.25 | 52.9 | 7,677 |
| 17 | 0.010928 | 2.00E+05 | 0.31 | 4.9E+03 | 7.1E+05 | 0.25 | 71.3 | 10,347 |
| 18 | 0.000668 | 2.00E+05 | 0.31 | 4.9E+03 | 7.1E+05 | 0.25 | 4.4 | 632 |
| 19 | 0.000788 | 2.00E+05 | 0.31 | 4.9E+03 | 7.1E+05 | 0.25 | 5.1 | 746 |
| 20 | 0.000808 | 2.00E+05 | 0.31 | 4.9E+03 | 7.1E+05 | 0.25 | 5.3 | 765 |
| 21 | 0.001593 | 2.00E+05 | 0.31 | 4.9E+03 | 7.1E+05 | 0.25 | 10.4 | 1,508 |
| 22 | 0.003413 | 2.00E+05 | 0.31 | 4.9E+03 | 7.1E+05 | 0.25 | 22.3 | 3,231 |
| 23 | 0.005233 | 2.00E+05 | 0.31 | 4.9E+03 | 7.1E+05 | 0.25 | 34.2 | 4,955 |
| 24 | 0.001558 | 2.00E+05 | 0.31 | 4.9E+03 | 7.1E+05 | 0.25 | 10.2 | 1,475 |
| 25 | 0.003338 | 2.00E+05 | 0.31 | 4.9E+03 | 7.1E+05 | 0.25 | 21.8 | 3,160 |
| 26 | 0.005118 | 2.00E+05 | 0.31 | 4.9E+03 | 7.1E+05 | 0.25 | 33.4 | 4,846 |
| 27 | 0.000658 | 2.00E+05 | 0.31 | 4.9E+03 | 7.1E+05 | 0.25 | 4.3 | 623 |
| 28 | 0.000638 | 2.00E+05 | 0.31 | 4.9E+03 | 7.1E+05 | 0.25 | 4.2 | 604 |
| 29 | 0.000618 | 2.00E+05 | 0.31 | 4.9E+03 | 7.1E+05 | 0.25 | 4.0 | 585 |
| 30 | 0.002310 | 2.00E+05 | 0.31 | 1.6E+03 | 2.3E+05 | 0.25 | 4.9 | 709 |

TABLE 3-continued

| Example | stored strain for metal (with ceramic) | Young's modulus metal at 25° C., MPa | Poisson's Ratio of metal, u | Young's modulus ceramic substrate at 25° C., MPa | Young's modulus ceramic substrate at 25° C., psi | Poisson's Ratio of ceramic u | Compressive Stress, MPa | Compressive Stress at 25° C., psi |
|---|---|---|---|---|---|---|---|---|
| 31 | 0.000750 | 2.00E+05 | 0.31 | 1.6E+03 | 2.3E+05 | 0.25 | 1.6 | 230 |
| 31 | 0.001820 | 2.00E+05 | 0.31 | 6.9E+03 | 1.0E+06 | 0.25 | 16.7 | 2,428 |
| 32 | 0.000602 | 2.00E+05 | 0.31 | 6.9E+03 | 1.0E+06 | 0.25 | 5.5 | 803 |

According to exemplary embodiments of the disclosure, a low cost exhaust gas treatment article and a canning method to produce the same is provided. In some embodiments, the exhaust gas treatment article and canning method to produce the same eliminates or minimizes the need for mats. Moreover, the exhaust gas treatment article avoids potential problems of the mat decomposing and fibers from the mat plugging downstream parts of an emission (exhaust) system. Another advantage of the low cost exhaust gas treatment article and canning method to produce the same according to exemplary embodiments of the disclosure is providing heat shielding of the honeycomb body from the housing achieved by blocking the outer cells of the honeycomb body via the metal mounting ring at the outer area of the honeycomb.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. An article, comprising:
   a porous ceramic honeycomb body having a plurality of channel walls extending from opposing end faces defining cell channels therebetween, and an outer periphery extending from one end face to the other; and
   a housing disposed on at least one of the outer periphery of the porous ceramic honeycomb body and the opposing end faces of the porous ceramic honeycomb body, wherein the housing exerts a compressive force on the porous ceramic honeycomb body in at least one of radial direction and axial direction, wherein the compressive force is greater than about 200 psi at about 25° C. and less than about 100 psi at about 200° C.

2. The article of claim 1, wherein the housing exerts radial and axial compressive force on the porous ceramic honeycomb body.

3. The article of claim 1, wherein the housing is shrink-fit to the porous ceramic honeycomb body.

4. The article of claim 1, wherein the housing comprises metal.

5. The article of claim 1, wherein a mat is disposed on the outer periphery and the housing is disposed on the mat.

6. The article of claim 1, wherein no mat is disposed on the outer periphery.

7. The article of claim 1, wherein no skin is disposed on the outer periphery.

8. The article of claim 1, wherein the compressive force is greater than about 200 psi at about 25° C. and less than about 100 psi at about 400° C.

9. The article of claim 1, wherein the compressive force is greater than about 200 psi at about 25° C. and less than about 100 psi at about 600° C.

10. The article of claim 1, wherein the honeycomb body comprises at least one of cordierite, aluminum titanate, mullite, alumina, zeolite, extruded catalyst, and silicon carbide (SiC).

11. The article of claim 1, wherein the honeycomb body comprises a skin disposed on the outer periphery, the skin comprising a modulus of rupture (MOR) greater than 800 psi.

12. The article of claim 1, wherein the honeycomb body comprises a skin disposed on the outer periphery, the skin comprising a modulus of rupture (MOR) greater than 1200 psi.

13. The article of claim 1, wherein the honeycomb body comprises a skin disposed on the outer periphery, the skin comprising a modulus of rupture (MOR) greater than 3000 psi.

14. The article of claim 1, wherein the housing comprises a coefficient of thermal expansion (CTE) of greater than about $80 \times 10^{-7}$ cm/cm/° C.

15. The article of claim 1, wherein the housing comprises a coefficient of thermal expansion (CTE) of between about $80 \times 10^{-7}$ cm/cm/° C. and $200 \times 10^{-7}$ cm/cm/° C.

16. An article, comprising:
   a porous ceramic honeycomb body having a plurality of channel walls extending from opposing end faces defining cell channels therebetween, and an outer periphery extending from one end face to the other; and
   a housing disposed on at least one of the outer periphery of the porous ceramic honeycomb body and the opposing end faces of the porous ceramic honeycomb body, wherein the housing exerts a compressive force on the porous ceramic honeycomb body in at least one of radial direction and axial direction, wherein the housing is disposed directly on the porous ceramic honeycomb body at 25° C.

17. The article of claim 16, wherein the housing is disposed directly on the porous ceramic honeycomb body at 25° C. and is spaced apart from the porous ceramic honeycomb body by a gap of about 1 to 100 microns at 400° C.

18. The article of claim 16, wherein the housing is disposed directly on the porous ceramic honeycomb body at 25° C. and is spaced apart from the porous ceramic honeycomb body by a gap of about 1 to 100 microns at 600° C.

19. The article of claim 16, wherein the housing is disposed directly on the porous ceramic honeycomb body at 25° C. and is spaced apart from the porous ceramic honeycomb body by a gap of about 1 to 100 microns at 800° C.

* * * * *